United States Patent [19]

Bursztejn

[11] 4,296,495
[45] Oct. 20, 1981

[54] DEVICE FOR MEASURING THE QUALITY OF A DIGITAL RADIO LINK

[75] Inventor: Jacques Bursztejn, Paris, France

[73] Assignee: Thomson CSF, Paris, France

[21] Appl. No.: 88,098

[22] Filed: Oct. 24, 1979

[30] Foreign Application Priority Data

Oct. 31, 1978 [FR] France ................................ 78 30848

[51] Int. Cl.[3] .............................................. G06F 11/10
[52] U.S. Cl. ......................................... 371/22; 371/49
[58] Field of Search ................................ 371/5, 22, 49

[56] References Cited

U.S. PATENT DOCUMENTS

| | | | |
|---|---|---|---|
| 3,916,379 | 10/1975 | Dulaney et al. | 371/5 |
| 4,022,988 | 5/1977 | Lentz et al. | 371/5 X |
| 4,093,940 | 6/1978 | Maniere | 371/22 |
| 4,200,838 | 4/1980 | Poitevin | 371/22 |

*Primary Examiner*—Jerry Smith
*Attorney, Agent, or Firm*—Roland Plottel

[57] ABSTRACT

The device determines the error rate by the periodic evaluation of the parity of a pre-determined number of bits, the synchronism of said evaluation at transmission and reception being ensured by the recognition of a predetermined sequence in the binary information signal, the parity information being transmitted by an auxiliary modulation independent of that of the information flow.

6 Claims, 2 Drawing Figures

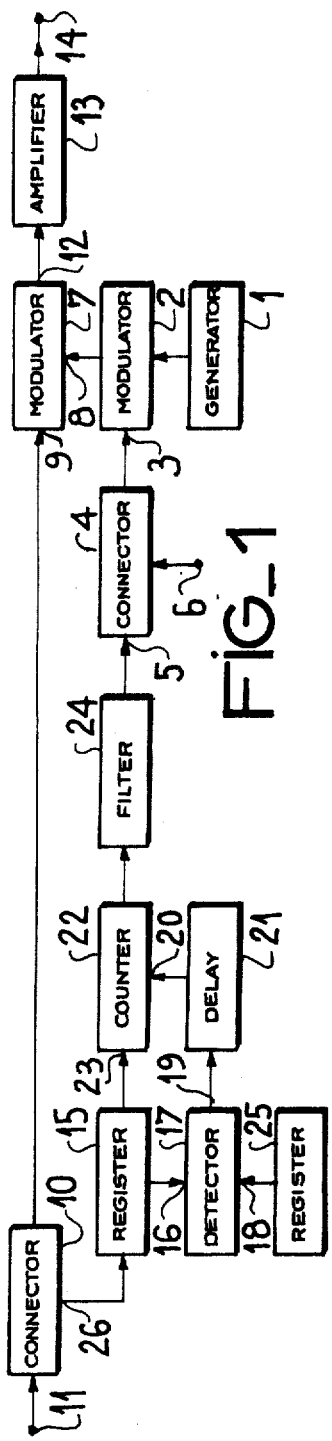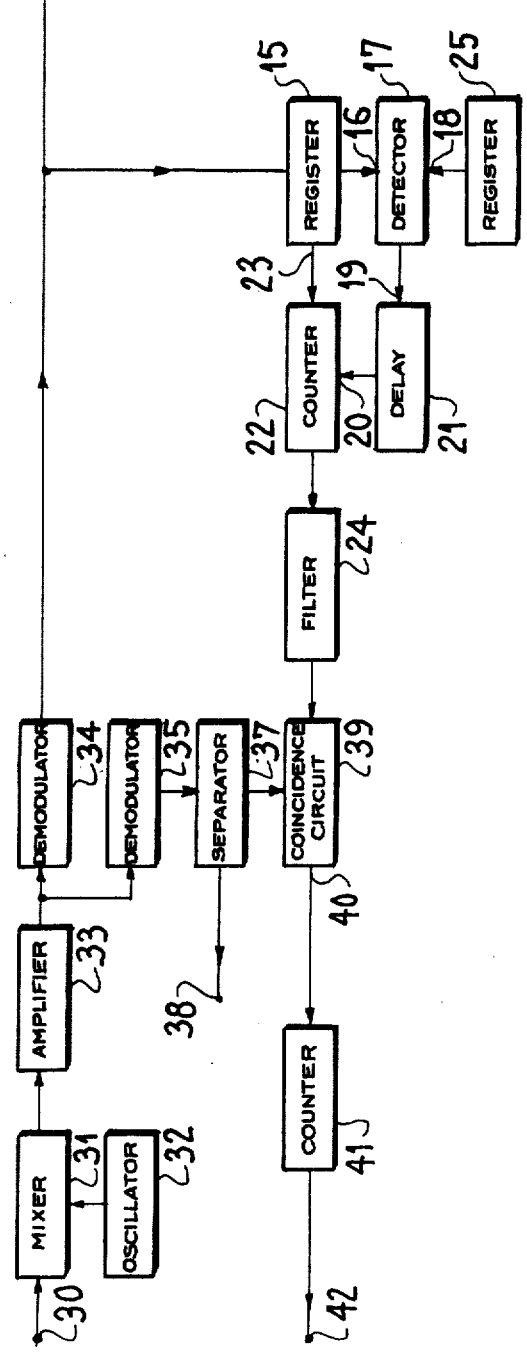

DEVICE FOR MEASURING THE QUALITY OF A DIGITAL RADIO LINK

BACKGROUND OF THE INVENTION

The present invention relates to devices for the operational checking of the quality of digital radio links by periodic evaluation of the parity of sequences of a number of pre-determined bits.

It is known to check the quality of transmission of a digital train without redundency by calculation of the parity of sequences of n successive transmitted bits. Thus, a parity information is obtained every n bits which is transmitted to the receiver of the link where the parity is calculated on the same sequences and the result is compared with the parity information received. This permits an evaluation of the transmission quality in the form of an error rate which serves as a criterion, particularly for bringing about the switching of equipment when this rate is above a predetermined value.

This requires the transmission of a time reference determining the beginning of the sequence for the parity calculation, so that it relates to the same sequences on transmission and reception. To this end supplementary bits are inserted in the transmitted digital train, and the parity bit is transmitted with the information. In general, advantage is taken of this modification in the signal pattern to include information necessary for operation in the same pattern.

However, this arrangement provides a needlessly frequent error rate information for high binary flow rates. For example for the flow rate of 34 Mbits/sec. the transmission or a parity bit every $10^4$ bits, corresponding to the detection of a threshold error rate of $10^{-4}$, represents the transmission of a parity information every 300 μs, whilst the switching operating time of equipment which can be controlled by such an information requires approximately 40 ms.

Above all this arrangement leads to a change to the in line binary flow rate and the use of numerous supplementary components in the equipment, which causes an increase in their consumption, cost and a decrease in their reliability, both with respect to the terminal stations and the relay stations.

BRIEF SUMMARY OF THE INVENTION

The object of the present invention is to obviate these disadvantages.

According to an aspect of the invention, there is provided a device for measuring the quality of a digital radio link, having a transmitter of a digital information signal and a receiver of that signal. The transmitter includes means for generating parity bits for sequences of n successive bits of information in the digital information signal, a control for determining the beginning of the sequence, and means for transmitting with said information signal at least part of said parity bits. The receiver includes a detector for detecting the transmitted parity bits. It also includes means for generating parity bits for sequences of n successive bits of information in the digital information signal, as received. It also has a control means for determining the beginning of a sequence and comparing means for comparing the transmitted parity bits and the generated parity bits. The latter control means does a bit by bit recognition of any sequence of k predetermined bits forming a reference sequence (k being smaller than n), and supplying a control signal to the parity bit generator.

BRIEF DESCRIPTION OF THE DRAWINGS

The invention is described in greater detail hereinafter in relation to non-limitative embodiments and the attached drawings, wherein show:

FIG. 1 a part of the measuring device according to the invention, in the transmission equipment of the digital radio link.

FIG. 2 a part of the measuring device according to the invention in the reception equipment of the digital radio link.

DETAILED DESCRIPTION OF THE PREFERRED EMBODIMENTS

In FIG. 1 an intermediate frequency generator 1 supplies a frequency modulator 2, whose modulation input 3 receives the signals applied to the input terminals 5 and 6 of a coupler 4. A phase modulator 7 receives at its carrier signal input 8 the output signal from modulator 2 and at its modulation input 9, across the coupler 10, the binary flow of information to be transmitted applied to the input terminal 11. The output 12 of modulator 7 is connected to the output 14 of the transmitter across a frequency conversion and amplification device 13. The assembly described hereinbefore constitutes a conventional transmitter, with phase modulation by digital signals, of the type involving the transmission of service information (applied to the terminal 6 and contained in a low frequency spectrum) by means of the auxiliary frequency modulator 2 inserted between the intermediate frequency carrier signal generator 1 and the phase modulator 7.

The device according to the invention has an 18 stages shift register 15 connected to the output 26 of coupler 10. The signals in these 18 stages are applied to a first multiple input 16 of coincidence detector 17, which receives at a second multiple input 18 the signals in the 18 stages of a memory register 25 loaded by a predetermined sequence, for example an alternating sequence of 1 and 0 logics. The output 19 of detector 17 is connected to the control input 20 of a counter 22 across a delay device 21. This counter 22 receives the bits supplied at the output 23 of register 15 and supplies the sequences resulting from the counting at input 5 of connector 4 across the low pass filter 24.

The operation of the device is based on the following principles.

For a random binary flow calculations show that the probability of having a predetermined sequence of k bits is $(\frac{1}{2})^k$, and that it will appear on average every $2^k + k - 1$ bits, i.e. roughly every $2^k$ bits. If N is the flow rate of the information bits the frequency F of the appearance of a predetermined sequence of k bits will be $F = N/2^k$.

These predetermined sequences serve as substitute for supplementary bits conventionally inserted into the digital train to define the beginning of the sequences from which is calculated the parity of a given quantity of transmitted bits.

In the present embodiment N is equal to 34 M bits/sec. and it is desirable to have a parity information at the most every 5 ms., i.e. F < 200 bits/sec. leading to the choice of k = 18, which corresponds to an average value of F equal to 130 bits/sec. In the average time interval separating two successive sequences there are therefore about 260000 bits which would, in theory, permit the determination of an error rate of approximately $4.10^{-6}$. In the present embodiment there has in fact been a limitation to the measurement of an error rate of $10^{-4}$, and counter 22 is provided for supplying a pulse on each occasion that it counts an even number of bits among the sequence of $n = 10000$ bits following the recognition of a predetermined sequence of k bits by coincidence detector 17, provided the same predetermined sequence has not been recognized less that 5 milliseconds earlier. The delay device 21 has in this example a logic AND gate having a signal input and a control input blocked by a monostable flip-flop for a period of 5 milliseconds started by the pulses received from the coincidence detector.

The object of this arrangement is to maintain at the most equal to 200 bits/sec. the repetition rate of the parity bit supplied by counter 22 and to limit the dispersion of this repetition rate. The signal from the counter 22 is converted into a sine wave by the low pass filter 24, which is transmitted at the same time as the service signals applied to terminal 6 frequency modulation input of the modulator 2.

FIG. 2 shows how the transmitted signals are processed on reception. In FIG. 2 the high frequency signals applied to the input terminal 30 and which have been transmitted by the transmitter described hereinbefore, are converted into intermediate frequency by mixer 31 associated with a local oscillator 32 and amplified by amplifier 33. In parallel the latter supplies phase demodulator 34 and frequency demodulator 35 which respectively supply the information binary train to output terminal 36 and the service data to separator 37. The latter supplies to a first output 37 the service data, with the exception of the signal representative of the parity bits, which is present at a second output. This second output is connected to a first input of a coincidence circuit 39, whose second input receives the parity information deduced from the received data at the output of the demodulator 34 across a structure identical to that of FIG. 1 with the same reference numerals 15 to 25.

The characteristic pulses of the divergence of parity bits supplied by the output 40 of circuit 39 are applied to a counter 41 which supplies a pulse to its output 42 whenever it receives more than two divergencies in the average time interval for the appearance of five parity bits. The average time for detecting a fault $\theta$ is then given by $$\theta = (5 \times 2^k)/N$$

so that for $N = 34$ M bits/sec. and $k = 18$, $\theta \# 38$ ms, whereby at the end of this time the pulse supplied to output terminal 42 starts the switching process.

It is assumed for the satisfactory operation of the system that the transmitted information signal is sufficiently close to a random signal. For this purpose it is possible to use a scrambler which multiplies the signal by a given polynomial.

The frequency conversion referred to hereinbefore is not necessary for operational purposes. It is obviously possible to transmit from a generator 1 supplying the signal at the transmission frequency, which leads to the disappearance of the converter included in device 13. In the same way on reception it is possible to replace the superheterodyne device constituted by components 31 to 33 by a simple amplification.

In the embodiment described the sequence of k bits is constituted by bits of alternating value. It can in fact be of a random type and in particular can be constituted by k identical bits. In the latter case members 15, 17 and 25 can be replaced for example by a simple counter of k bits which is zeroed by the presence of each polarity bit opposite to that of the bits constituting the pre-determined sequence.

The parity information can be transmitted by numerous other per se known means independent of the binary information flow, for example by phase modulation of the transmitted binary flow rate or by angular modulation of the local oscillator of the converter included in device 13.

What is claimed is:

1. A device for measuring the quality of a digital radio link comprising transmission means and reception means respectively for transmitting a digital information signal and for receiving said transmitted digital information signal, said transmission means comprising means for generating parity bits for sequences of n successive bits of information in said digital information signal; control means determining the beginning of said sequences and means for transmitting with said information signal at least part of said parity bits; said receiving means comprising detection means for detecting the transmitted parity bits, means for generating parity bits for sequences of n successive bits of information in said digital information signal received, control means determining the beginning of said sequences, and comparing means for comparing the transmitted parity bits and the generated parity bits; said control means in said receiving means comprising means for bit by bit recognition of any sequence of k predetermined bits forming a reference sequence, k being smaller than n, and supplying a control signal to said means for generating parity bits.

2. A measuring device according to claim 1, wherein the receiving means control means comprise a detector of the coincidence of the states of a shift register of k stages traversed by the information bits and a register of k stages loaded by the reference sequence.

3. A measuring device according to claim 1, wherein the reference sequence is constituted by bits having the same logic value, the control means comprising a counter receiving said information signal which advances by one step for each bit having said logic value, and returning to zero for each bit having a reverse value and returning to zero after counting k successive bits having said logic value.

4. A measuring device according to claim 1, wherein the transmission means comprise a modulator which angularly modulates the information signal to be transmitted by the repetition rate of the parity bits.

5. A measuring device according to claim 1, wherein the transmission means comprise a multiplex of operating channels, said parity bits being incorporated on a channel of said multiplex by auxiliary modulation.

6. A measuring device according to claim 1, wherein said control means comprise a delay device blocking any control signal a predetermined time interval after supplying a control signal.

* * * * *